Aug. 10, 1937.  F. V. BARYCZ  2,089,528
SLITTING AND CUTTING DEVICE FOR WIRE INSULATION AND THE LIKE
Filed April 20, 1935  3 Sheets-Sheet 1
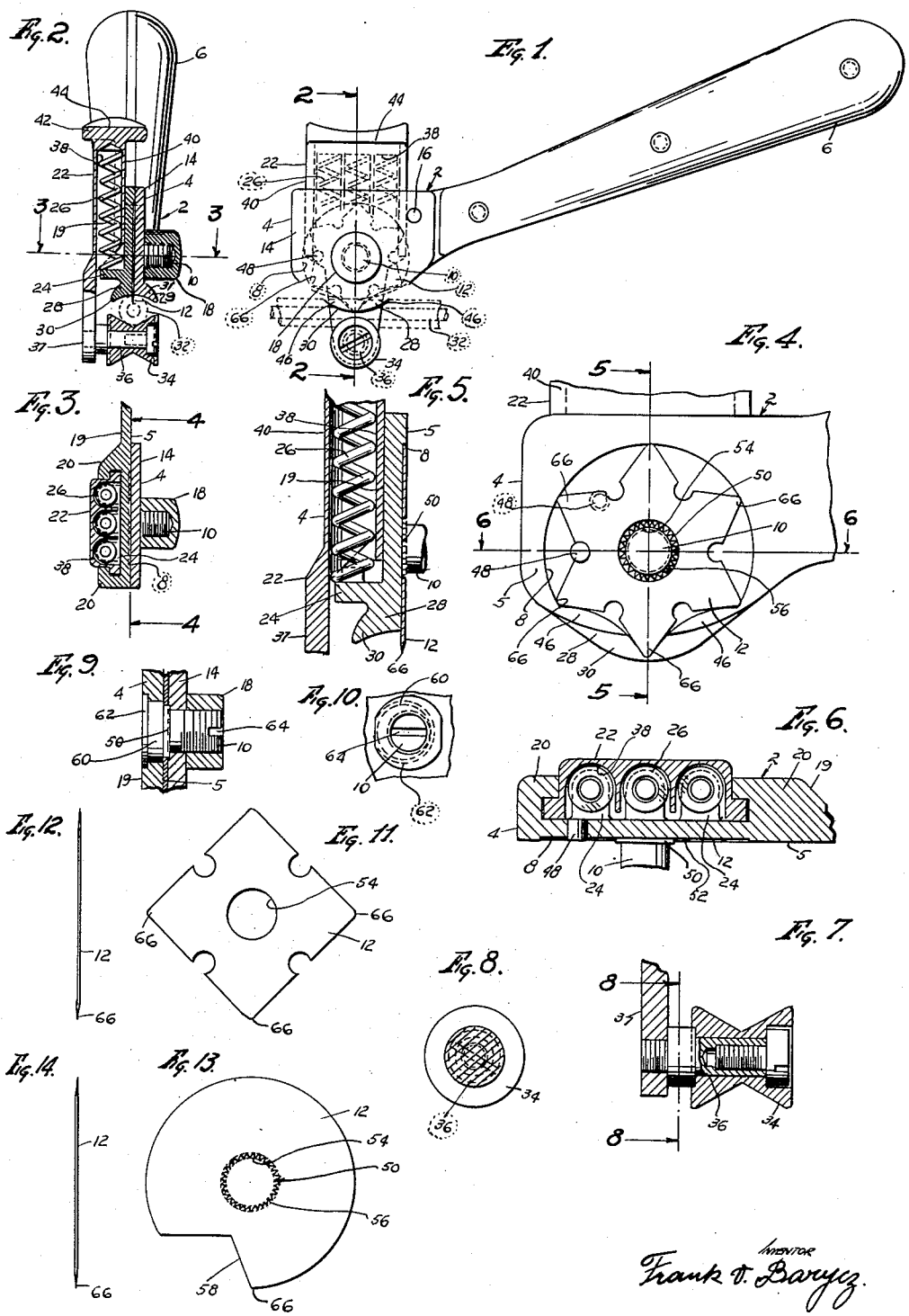
Frank V. Barycz

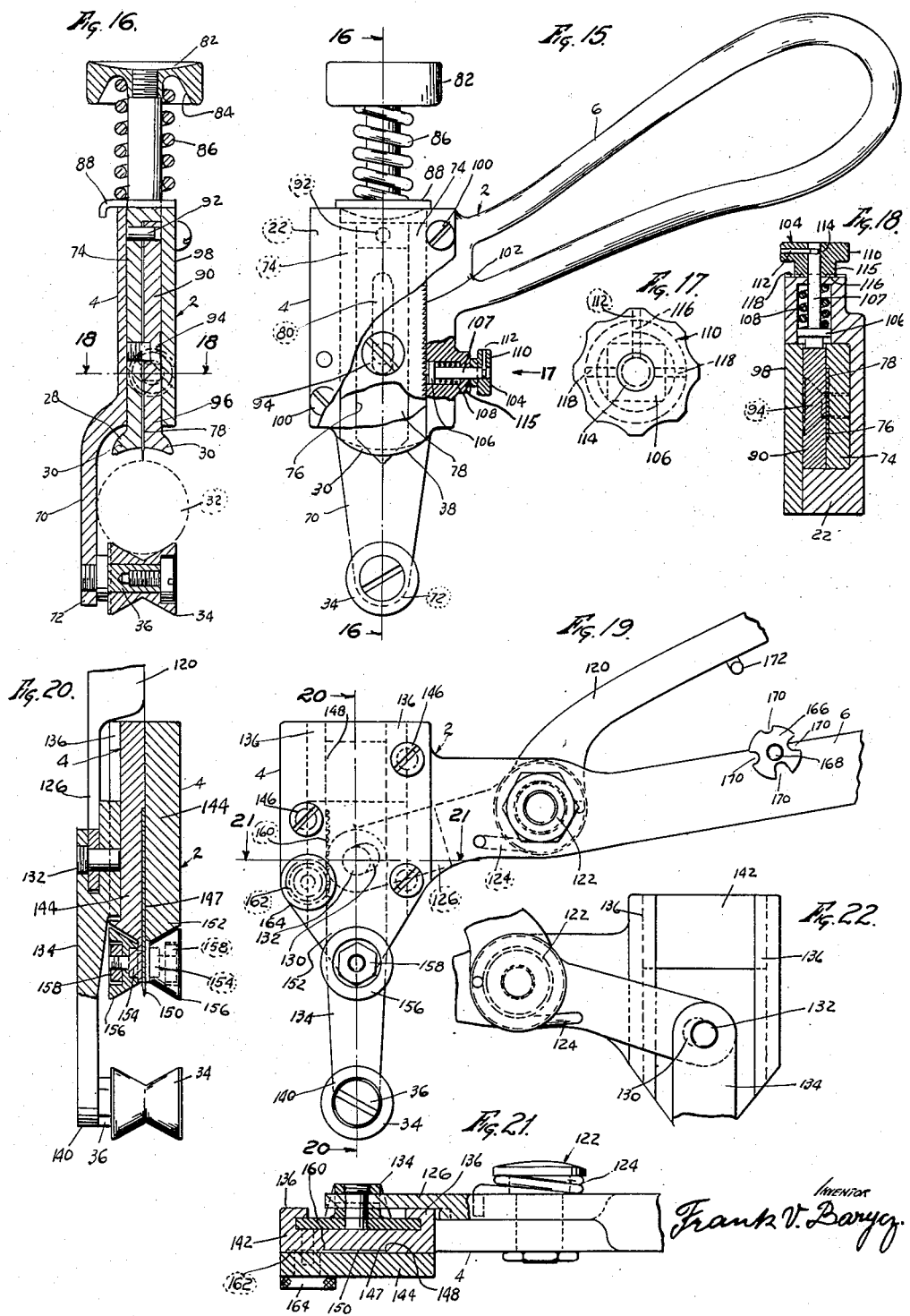

Aug. 10, 1937.  F. V. BARYCZ  2,089,528
SLITTING AND CUTTING DEVICE FOR WIRE INSULATION AND THE LIKE
Filed April 20, 1935  3 Sheets-Sheet 3
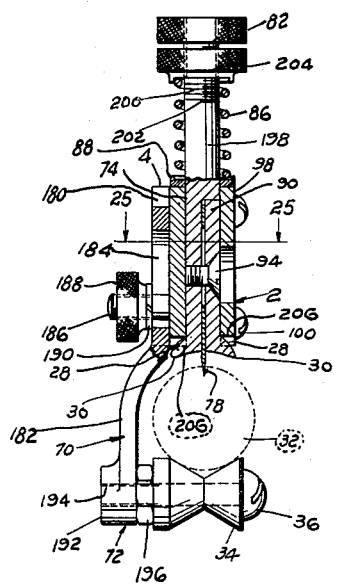
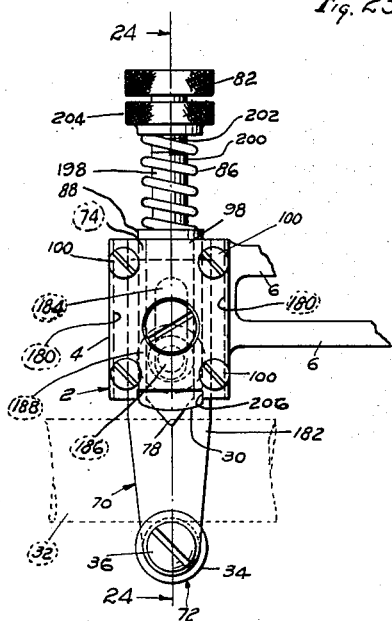
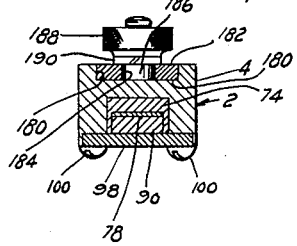
Inventor
Frank V. Barycz Patented Aug. 10, 1937

2,089,528

UNITED STATES PATENT OFFICE 2,089,528

SLITTING AND CUTTING DEVICE FOR WIRE INSULATION AND THE LIKE

Frank V. Barycz, Los Angeles, Calif., assignor of one-half to Anthony Carta, Los Angeles, Calif.

Application April 20, 1935, Serial No. 17,483

8 Claims. (Cl. 81—9.5)

My invention relates to the insulation slitting device which is particularly adapted for cutting and separating the wire insulating covering materials, which are used for covering the electric wires and cables.

One of the primary objects of my invention is to provide a device in the form of a hand-tool, which is simple in construction, inexpensive to manufacture and maintain, easy to handle and operate, and particularly adapted for work in the field and the shop while cutting and stripping the wire insulation.

Another object of my invention is to provide a device which may be operated by one hand, so that while the tool is guided over the wire or a cable, the cutting knife provided therein will cut and separate the insulation material quickly and effectively.

A further object of my invention is to provide a device which is equipped with guiding means, adapted to guide the wire or a cable whereon its insulation is to be cut, having a cutting means positioned in a housing in juxtaposition to the said guiding means, thus causing the said cutting means to cut and separate the said insulation directly in the center, of the said wire or cable.

A further object of my invention is to provide the said device with the wire guiding means, rotatably mounted upon a stud member, which may be adjusted into position and beneath the cable or the wire from which the insulation is to be removed, said guiding means being adapted to locate said wire or cable in center position, so that the cutting means will cut the insulation in the center, without injuring the center core of the said wire or cable, allowing it to be removed quickly and effectively.

Another object of my invention is to provide the said wire with a housing having a recess means, wherein a suitable knife is positioned, said knife may, if so desired, be provided with a plurality of cutting edges adapted to be easily adjusted when dull or while in use, having in addition thereto, a centralizing stud means, for the purpose to adjust the position of the cutting edge in relation to the depth or thickness of the insulation, so that the device may be easily adjusted by the user thereof to meet the necessary requirement, as the case may be.

Another object of my invention is to provide the said housing with rotatable guiding means, adapted to guide the cutting knife therein between, and which is for the purpose to prevent dragging of the insulation material, so as to render the said cutting knife more effective during its operation.

Further objects and advantages of my invention, as will hereinafter more fully appear, I attain by the construction described in the specification and illustrated on the drawings, forming a part of my application.

Reference is had to the accompanying drawings, in which the similar reference characters denote the similar parts.

In the drawings;

Fig. 1 is the side elevational view of the device showing the position of the wire between the guiding rollers and the cutting knife.

Fig. 2 shows the vertical cross-sectional view of the housing of the device, taken on the line 2—2, of the Fig. 1.

Fig. 3 is the transverse cross-sectional view of the housing, taken on the line 3—3, of the Fig. 2.

Fig. 4 is the enlarged elevational view of the housing, showing the position of the cutting knife, taken on the line 4—4, of the Fig. 3.

Fig. 5 is the vertical cross-sectional view of the housing, taken on the line 5—5, of the Fig. 4.

Fig. 6 is the transverse cross-sectional view of the housing, taken on the line 6—6 of the Fig. 4.

Fig. 7 shows the enlarged cross-sectional view of the guiding roller.

Fig. 8 shows the cross-sectional and end-elevational views of the said guiding roller, taken in the direction of the lines 8—8, of the Fig. 7.

Fig. 9 shows the cross-sectional view of the center adjustable stud of the housing, in modified form.

Fig. 10 shows the end-elevational view of the center adjustable stud.

Fig. 11 shows the cutting knife, in modified form.

Fig. 12 shows the end-elevational view of the cutting knife, shown in Fig. 11.

Fig. 13 shows another form of the cutting knife, in modified form.

Fig. 14 is the end elevational view of the cutting knife, taken from Fig. 13.

Fig. 15 shows the partly fragmentary and elevational views of my invention, in modified form.

Fig. 16 is the vertical cross-sectional view of the device, taken in the direction of the lines 16—16, of the Fig. 15.

Fig. 17 shows the end-elevational view of the ratchet stop of the device, taken in the direction of the arrow 17, of the Fig. 15.

Fig. 18 is the transverse cross-sectional view of the housing, showing the position of the ratchet and the knife, taken in the direction of the line 18—18, of the Fig. 16.

Fig. 19 shows the device, in another modified form.

Fig. 20 is the vertical cross-sectional view of the device, taken on the line 20—20, of the Fig. 19.

Fig. 21 is the transverse cross-sectional view of the housing, taken in the direction of the lines 21—21, of the Fig. 19.

Fig. 22 is the enlarged fragmentary elevational view showing the opposite side of the controlling lever of the said device, taken from the front of Fig. 19.

Fig. 23 is the fragmentary front elevational view of the cutting device, showing the position of the adjustable plate.

Fig. 24 is the fragmentary cross-sectional view of the cutting device, taken on the line 24—24, of the Fig. 23.

Fig. 25 is the transverse cross-sectional view of the cutting device, taken on the line 25—25, of the Fig. 24.

Describing my invention more in detail, said invention comprises a frame generally designated by numeral 2, which consists of a housing 4, and a handle member 6.

Said housing 4, is provided at the side 5 with a recess 8, wherein, a stud member 10 is positioned, which is to receive a suitable knife member 12, also having a cover 14, enclosing the said recess 8, and adapted to hold the said knife member 12 in place; for the purpose to prevent said cover 14 from shifting out of place, a suitable dowel pin 16 is provided therein, and which is supported by means of a nut 18, engaging the stud member 10, as shown in the Figs. 2 and 3.

Said housing 4, at the side 19 is provided with a pair of guiding bars 20, adapted to receive therein, a suitable guiding bracket 22, having at its mid-section a plurality of bosses 24, as shown in the Figs. 5 and 6, which are adapted to support therein, suitable resilient members 26, the purpose of the operation of which will be presently described.

The lower section 28, of the said housing 4, and the section 29 of the said cover 14, are provided with flared out guiding members 30 and 31 respectively, which are for the purpose to guide the wire or the cable 32 into a central position, so that the insulation may be cut centrally and lengthwise by the said knife member 12, as shown more particularly in the Figs. 2 and 16.

For the purpose of holding the said wire 32 in position against the knife member 12, and against the said guiding members 30 and 31, respectively, a suitable roller member 34 is provided therein, which may, if so preferred, be of double-conical structure, rotatably mounted upon a stud member 36, supported by a suitable guiding bracket extension 37, thus allowing the said resilient member 26, enclosed within suitable sockets 38, to guide and hold the roller member 34 against the said wire 32 while said device is being used.

For the purpose of adjustment, of the said roller member 34 to any preferred size or shape of wire, the top section 40, of the said guiding bracket 22, has a suitable flanged section 42, which is provided with a suitable concave surface 44, so that by pressing the said guiding bracket 22 downwardly, variable sizes of wire may be placed between the said roller member 34 and the knife member 12, and due to the angularly extended position of the said lower section 28, of the said housing 4, and the said section 29 of the cover 14, as shown more particularly in the Figs. 1, 4, and 15, the cutting of the insulation may be easily effected, irrespective of the position of the device in relation to the said wire 32, while said device is in use.

The said recess 8 may, if so desired, be provided with suitable bottom guides 46, also having a locating pin 48 positioned therein, which is for the purpose to hold the said knife member 12 in place while in use, and if it is so desired, the said stud member 10, may be provided with serrations 50, positioned closely to the surface 52, of the said recess 8, so that, either the central hole 54, or the corresponding serrations 56, within the said knife member 12 may be held in engaged position, particularly when the cutting edge 58 is ground or sharpened, to meet special requirements, as shown in the Fig. 13.

Also, if it is so desired, said stud member 10, may be provided with an offset collar member 60, having a retaining flange 62 and a slot 64, as shown in the Fig. 9, so that, by adjusting the position of the said stud member 10, the cutting point 66 of the said knife member 12, may be adjusted vertically therein to meet the special thickness of the insulation, which is to be cut upon the wire or cable 32.

By means of the said adjustable stud member 10, a rapid change of the knife as well as the change of position of the cutting edges of the said knife 12 may be had without difficulty, consequently resulting in saving of great deal of time, not only while cutting insulation, but particularly when cutting the insulation of the wire of diversified diameters, having its insulation of variable thicknesses, and therefore, for a fine wire covering the knife as shown in Fig. 4 may be used, while for a medium grade of insulation a knife shown in Fig. 11 may be adaptable and when cutting a heavy grade of wire insulation, a knife of heavier construction may be preferred, as shown in Fig. 13.

It may be noted, that in operation, the guiding roller 34 is placed beneath the wire 32, having insulating material covering it and which is to be slitted, causing said wire to be held in place and position while by the knife cutting edge 66 comes in contact by the downward movement exercised and imposed thereto by the user of the device when using and pressing said guiding bracket 22 and which pressure coupled with lengthwise movement over said wire 32 will cause said knife edge 66 to slit open the wire insulation.

As shown in the Figs. 15 and 16, the frame 2 comprises of a housing 4, having a handle member 6, which may, if so desired, be made out of wire or other suitable material. Said housing 4, is provided with an extension bracket 70, which is an integral part thereof, having its end 72, provided with a roller member 34, mounted upon the said stud member 36.

Said housing 4 is provided with a pair of guiding bars 22, adapted to receive therein a plunger member 74, comprising a recess 76 wherein the cutting knife 78 is positioned and guided therein, having its lower section 28 provided with the flared out member 30 and the top section provided with a suitable knob 82, which is provided with an internal recess 84 to receive therein a resilient member 86, being supported by a washer member 88, so as to hold it in position and cause its free movement, within said guides 22.

The said cutting knife 78, is encased within a suitable recess 89 and held in place by means of a cover member 90, which is located in position by means of a locating pin 92 and secured therein by means of a screw 94, of which its lower extension 96, is provided with a flared out member 30, for the purpose hereinbefore described and which is held in place, by means of a cover 98 supported by suitable screws 100, as shown in in the Fig. 15.

Said cover member 90 is also provided with suitable serrations 102 adapted to engage a ratchet member 104, comprising, a ratchet 106 having a suitable stem member 107, which is held in place by means of a spring member 108 and the engagement of which is controlled by means of a knob member 110.

Said knob 110 having a pin 112 adapted to engage the ratchet stem groove 114 which is positioned as shown, and the bottom 115 of the said knob 110 is provided with a suitable ridge 116 adapted to engage a groove 117, which is positioned at the surface section of the hub 118, so that, by turning the said knob 110 into engaging position, said knife 78 may be set to a cutting depth by pressing the knob 82 and thus causing the ratchet 106 to engage said serrations 102 and therefore allowing a uniform slitting of the wire insulation covering at any desired length, also by releasing said ratchet 106 the expanding spring 86 will cause the said knife 78 to be placed in its original position, so that a different setting of the knife 78 may be had for the wire of different diameter or a different depth of the slit.

In the operation of the device as above described, it may be noted that, when cutting the wire insulation, said wire is placed between the roller 34 and the cutting knife 78, which, by the pressure of the knob member 82, is forced into insulation at a depth controlled by the said pressure and, if so desired, the knife position may be set by means of the adjusting device, as shown in Fig. 18, whereby not only that the wire slitting may be controlled as to its uniformity, but also, by the use thereof, cutting too deep and marring of the wire is entirely eliminated.

In the Fig. 19, is shown the device in modified form, comprising a housing 4, having a handle 6 provided with a supporting handle member 120, pivotably movable about a pivot point pin 122, having a spring member 124, engaging the extension member 126, to hold the said handle 120 in place and in downward position, as shown.

Said extension member 126 is provided with an elongated slot 130, adapted to engage a pin 132, to control the position of the extension member 134, which is slidably positioned within guides 136, having its lower section 140, provided with a suitable roller member 34.

Said housing 4, is made preferably of two part sections 142 and 144 respectively, of which, particularly the part 142, being an integral part of the housing 4 and the other part 144, being a clamping member, held in place, by means of a screw 146.

The split section 146, of the said sections 142 and 144 respectively, are provided with a longitudinal guide 148, which is adapted to receive therein a suitable knife member 150, having its lower portion 152 provided with a suitable stud member 154, to receive therein a pair of frustrum cone rollers 156, and thus forming upper roller guides.

Said rollers 156 are held in place by means of nuts 158, so as to allow said rollers to contact the wire insulation without dragging and in order to permit an adjustment of the said knife member 150, to conform to the thickness of the wire or cable insulation, said knife 150 is provided with suitable serrations 160, adapted to engage the knife controlling washer 162, which may, if so desired, be controlled by a suitable knob member 164, as shown particularly in the Fig. 21.

In order to control the position of the said knife member 150, in relation to the said rollers 34 and 156 respectively, the said handle 6, is provided with a suitable adjusting roller 166, which is mounted upon a pin 168, and provided with grooves 170, which may, if so desired, correspond to the various thicknesses of the insulations which are to be cut and to permit an engagement of the gage member 172, when the handles 6 and 120 respectively, are in position, thus preventing the cutting of the said insulation too deep, while in use.

Obviously it may be noted, that the device, as shown and described, see Figs. 15, 16, 17 and 18, may be provided in modified form, as shown more particularly in Figs. 23, 24 and 25 respectively, wherein the frame 2 in the form of a housing 4 is provided with suitable recess 180, and wherein a detachable extension bracket 182 is adjustably positioned, having a suitable slot 184 adapted to receive therein a stud member 186 which is an integral part of the said housing 4, so that the said extension bracket 182 may be held and locked in position by means of a suitable thumb nut 188 and supported in place by means of the lock washer 190, as shown.

The lower section or the end 72 of the said bracket 182 is provided with suitable boss member 192 which is provided with threaded hole 194 adapted to receive therein the said stud member 36 having the said roller member 34 revolubly mounted and locked in place by means of a lock nut 196.

The plunger member 74 being provided with suitable stem 198 has its extreme end 200 provided with suitable thread 202 which is to receive the said knob 82, and, in order to provide variation in the spring tension, said spring or resilient member 86, supported in place by means of the said washer 88, is held in place by means of suitable adjustable knob 204, also, in order to provide the clearance for the said wire 32, between the said housing 4 and the said roller member 34, the lower section of the said housing 4 and the cover 98 is provided with suitable bottom recess 206, so that the said flared out end members 30 may pass thereunder, and thus provide the required clearance while adjusting the said device before cutting the said slit within the insulation of the said wire or cable.

It may be noted, that the device as shown in Figs. 23 to 25 respectively, may be used for cutting the insulated wire of diversified diameters, and, that the bracket 70 may be adjusted to any desired position in order to allow said wire 32 to rest upon the roller 34, also, that the knife 78 is mounted within an independently functioning and adjustable plunger member 74, so that, when the knob member 82 is pressed downwardly, causing the knife's sharp edge to cut into the insulation at a depth which is governed by the position of the said knife held in place by means of the screw 94, said depth position may be maintained at all times during the operation and the slitting operation is performed by permitting said wire 32 to roll longitudinally over the roller 34, as previously described.

In operation, the guiding roller 34 is placed beneath the wire, the insulation of which is to be slitted and by pressing the lever 120 said roller 34 raises upwardly, allowing the knife edge 156 to come in contact with the said insulation and thus, coupled with the lengthwise movement of the said device over said wire 32, said insulation becomes cut and slit to any depth and the length, as in practice may be most desirable. Also, after the cutting operation, by releasing said lever 120 the reaction movement of the spring member 124 causes said plunger 134 and the bottom roller 34 to move downwardly, releasing the wire 32 from its cutting position, so that it may be removed.

While I have thus described my invention with great particularity, it will be clear that the same may be modified throughout a wide range.

I, accordingly, do not propose to be limited to the exact details of construction, herein shown in the drawings and described in the specification, but reserve the rights in practice to make the necessary changes therein which may come within the scope of the appended claims.

I claim as my invention:

1. In the devices of the class described adapted to be used in connection with slitting of the wire insulation, comprising a frame, a handle attached to said frame, said frame forming a housing, one side of said housing provided with an adjustable cutting knife held in place by means of a cover, the lower section of the said housing and said cover provided with a flared out member adapted to guide the cutting edge of said knife member and also to guide the said wire into position, the opposite side of said housing provided with an adjustable guide, the lower section of said guide being provided with rotatable guiding means mounted upon a stud and means positioned between said housing and said adjustable guide, adapted to hold the said guiding means in position and against the said wire, thus causing said wire to be held against the said flared out members, causing the cutting edge of said knife member to cut a slit within said wire insulation, substantially as described.

2. In the devices of the class described, comprising a frame, a handle connected to said frame, said frame forming a housing, the side of said housing being provided with a recess, stud means adjustably positioned within the center of said recess of said housing, a cutting knife member positioned within said recess of said housing, having a locating pin positioned therein, so as to hold the cutting edge of the said knife member in located position, a cover member encasing said housing side and said knife member, held in place by means of a nut engaging the said adjustable stud member, a pair of flared out members positioned at the lower section of said housing in close proximity with said cutting edge of said knife member adapted to guide the wire into position, for cutting a slit within its insulation and adjustable means slidably associated with the opposite side of said housing, having a rotatable guiding means positioned in juxtaposition to said flared out member, so that, the said wire may be guided and held in place while cutting the slit within its insulation, substantially as described.

3. In the devices of the class described adapted to be used in connection with cutting a slit within the insulation of the electric wire or cable, comprising, a frame, said frame forming a housing, a handle substantially connected with said housing, a bracket extension connected to the lower section of said housing, a stud connected to the end of the said bracket extension, guiding means rotatably positioned upon the said stud adapted to guide the said wire in place, a plunger member slidably positioned within said housing, comprising, a recess formed within said housing, a cutting knife adjustably positioned within said recess of said housing, a cover member positioned over said plunger adapted to hold the said knife in place, the top section of the said plunger provided with a stem having a washer positioned at its base, a knob connected to the top of said stem having a resilient member positioned between said knob and said washer, so as to hold the said plunger in position; the lower section of said plunger and said cover being provided with flared out members, adapted to guide the said wire held thereagainst and supported by means of said guiding means to be cut lengthwise and in the center thereof.

4. In the devices of the class described adapted to be used in connection with slitting the insulation of the electric wire, comprising, a frame forming a housing, said frame having a handle extending therefrom adapted to hold the said frame in slitting position, a movable handle bar pivotally connected to said handle of said frame having an extension adapted to engage a guide member slidably positioned at one side of said housing, a resilient member connected to the said pivot of said handle bar adapted to hold the said bracket extension in position, rotatable guiding means connected to the end of the said bracket extension adapted to guide and hold the said insulating wire in position; the opposite side of said housing provided with, a recess formed within said housing, a cutting knife blade positioned within said recess of said housing having its cutting edge extending downwardly in juxtaposition to the center of the said guiding means, the lower section of the said frame being provided with a stud having a guiding roller rotatably positioned thereon, a cover member covering the said housing and adapted to hold the said cutting knife in position, the lower section of the said cover member being provided with a stud adapted to receive a roller rotatably positioned thereon, thus forming a pair of guiding rollers having a cutting edge of said cutting knife positioned centrally and therebetween, so that the guiding roller of said bracket extension and the guiding rollers of the said housing and said cover will cause the said wire to be guided therebetween, allowing said knife to cut its insulation centrally also lengthwise and preventing the dragging of the insulation of said wires.

5. In the hand tools of the class described adapted to be used for slitting insulation upon wires or cables, comprising in combination, a frame having a handle, said frame consisting of an angularly shaped housing provided with a centrally positioned recess, a conical roller attached to said housing and at the end of the said angular structure, a movably attached bracket member positioned at one side of said frame having a wire guiding roller attached to its end, a cutting knife member adjustably positioned at the other side of said frame and within said recess of said housing, a knife covering member angularly shaped to conform with said housing for holding said knife member within said recess and having a conical roller attached at the end of said knife covering member in juxtaposition to the said roller attached to said housing and allowing said cutting knife member to pass therebetween, and a knife adjusting means associated with said housing interlocking said knife for adjusting the cutting end of said knife member to the depth required for slitting the insulation upon said wire or cable.

6. In the devices of the class described, adapted to be used for cutting a slit within and upon the insulation of the wire or cable, comprising, a frame, consisting of a housing and a handle attached thereto, said housing having the front and the rear surface sides provided with recess, a bracket member slidably positioned within said rear surface recess of said housing, having an extension terminating with a boss member, holding means associated with said housing adapted to hold and lock the said bracket member in adjustable position, a stud member mounted within said boss member of said bracket extension, a roller member revolubly mounted upon said stud member for supporting the said wire or cable in place; a plunger member having a pair of flared bottom ends and a stem provided at the top end, adapted to be slidably positioned within the said front surface side of said housing, a cover member positioned over the said front surface side of said housing for holding the said plunger member in place, a bottom recess associated with said housing and said cover member adapted to receive the said flared bottom ends of said plunger member, a cutting knife positioned between the said pair of said flared bottom ends for cutting said slit upon and within the said insulation of said wire or cable; a threaded surface positioned upon the extreme end of said stem of said plunger member, a resilient member positioned over the said stem, held against the said housing by means of a washer, an adjustable knob member engaging the said threaded stem end for controlling the tension of the said resilient member and a knob member connected to the end of the said stem for controlling the position of the said plunger and said knife, when cutting the slit upon and within the insulation of said wire or cable.

7. In the hand tool of the class described adapted to be used for slitting wire insulation covering, comprising, the combination of, a frame forming a housing having a handle bar attached to and extending therefrom, a pair of rollers connected to said housing and forming upper guiding means, a wire insulation covering slitting means positioned between said last mentioned means and extending therefrom so that the said wire insulation covering passing thereunder may be slitted, a pivot pin connected to said handle bar of said housing, a handle member pivotally attached to the said pivot pin having an extension member, a guiding means having a bottom guide roller the latter guiding means being connected to the said extension member and slidably positioned within a recess at one side of said housing, whereby the wire is guided between the bottom guide roller and the upper guiding means and slitting means, an adjustable gaging means positioned at the mid-section of said handle bar and said handle member for gaging and controlling the depth of the slit within said wire insulation covering, and resilient means encompassing said pivot pin having one end connected to the said handle bar and the other end to the said extension member of said handle member for maintaining a relatively open position between said upper roller guides and the said bottom guiding roller, before and after the slitting operation.

8. In the hand tools of the class described adapted to be used for cutting a slit within the insulation of electric wire or cable, comprising, a frame forming a housing, a handle positioned at one side edge of said housing forming an integral part thereof, a recess formed within said housing at one side of said handle, a pair of knife holding members slidably positioned within said recess having an upper end provided with a plunger bar and the lower end provided with a flared out member for guiding and holding said wire in place, a ratchet member at one side of the housing cooperating with serrations on the side of one of the knife holding means, a knife blade member substantially positioned between said pair of knife holding members for cutting said slit within the insulation of said wire, a knob member positioned at the end of said plunger bar for controlling the position of the said knife blade while cutting said slit, a resilient member positioned between the said housing and the said knob member for retarding and returning said knife blade to its original position, an extension member extending rearwardly and downwardly of said housing terminating with a supporting roller member for holding said wire in place and for guiding said wire beneath the said flared out members and said knife blade, and resilient means adjustably positioned within said housing in juxtaposition to said serrations of said knife holding members for controlling the uniformity of the slit within said insulation of said wire, substantially as described.

FRANK V. BARYCZ.